United States Patent
Mitchell

(10) Patent No.: US 6,349,435 B1
(45) Date of Patent: Feb. 26, 2002

(54) BEDRAIL ATTACHMENTS FOR ENGINEERED WOOD BEDRAIL

(76) Inventor: Herbert L. Mitchell, 1 Chowan Rd., Greensboro, NC (US) 27407

(*) Notice: Subject to any disclaimer, the term of this patent is extended or adjusted under 35 U.S.C. 154(b) by 0 days.

(21) Appl. No.: 09/444,423

(22) Filed: Nov. 19, 1999

(51) Int. Cl.[7] ............................................... A47C 19/02
(52) U.S. Cl. ............................................ 5/296; 5/282.1
(58) Field of Search .................. 5/296, 282.1, 288–295, 5/297–304; 29/91, 91.1

(56) References Cited

U.S. PATENT DOCUMENTS

| | | | |
|---|---|---|---|
| 23,525 A | 4/1859 | Buxton ........................... | 5/296 |
| 1,972,108 A | 9/1934 | Richardson .................... | 5/296 |
| 2,132,131 A | 10/1938 | Schilling ........................ | 5/294 |
| 2,160,174 A | 5/1939 | Scalera ........................... | 5/296 |
| 2,211,980 A | 8/1940 | Luppert .......................... | 5/286 |
| 2,242,537 A | 5/1941 | Moore ............................. | 5/296 |
| 2,246,090 A | 6/1941 | Filer ............................... | 5/296 |
| 2,305,063 A | 12/1942 | Collins ........................... | 5/296 |
| 2,539,933 A | 1/1951 | Silverman ...................... | 5/296 |
| 3,226,736 A | * 1/1966 | Krieger .......................... | 5/296 |
| 3,305,880 A | 2/1967 | Cloutier ......................... | 5/298 |
| 3,861,527 A | 1/1975 | Perkins ....................... | 206/344 |
| 3,906,695 A | * 9/1975 | Pilgrim et al. ................ | 52/489 |
| 4,148,106 A | 4/1979 | Gallien .......................... | 5/296 |
| 4,376,317 A | 3/1983 | Johnston ......................... | 5/80 |
| 4,389,741 A | 6/1983 | Larson .......................... | 5/400 |
| 5,567,027 A | * 10/1996 | McClung et al. ........... | 312/219 |

OTHER PUBLICATIONS

Design Considerations For The Use Of Rivets; Information from the Internet; undated.
National Rivet & Manufacturing Co.; diagram of a rivet May 18, 1999.
General Specifications For Tubular Rivets; Information from the Internet; undated.

* cited by examiner

Primary Examiner—Alexander Grosz
(74) Attorney, Agent, or Firm—MacCord Mason PLLC

(57) ABSTRACT

A hook and fastener assembly for hooking engineered wood bed rails to the bedpost of headboards and footboards. Includes a bed rail hook configured to slide into the end of a bed rail made of engineered wood. Engineered wood may include any type of man made wood material, including particle board, medium density fiberboard, oriented strand board, and the like. Rivets extend through the bed rail and through apertures in the inserted portion of the bed rail hook in order to securely fasten the bed rail hook in the bed rail end. The same or similar rivets used to secure the bed rail hook may also be oriented in the bedpost in a manner allowing downwardly extending hooks of the bed rail hook to engage the rivets and securely hold the bed rail to the bedpost. The rivets are semi-tubular rivets and include a head and a shank. The ends of the shank are clinched during assembly to secure the rivet and provide substantial removal resistance. Preferably, the ends of the shank form a rolled clinch.

15 Claims, 4 Drawing Sheets

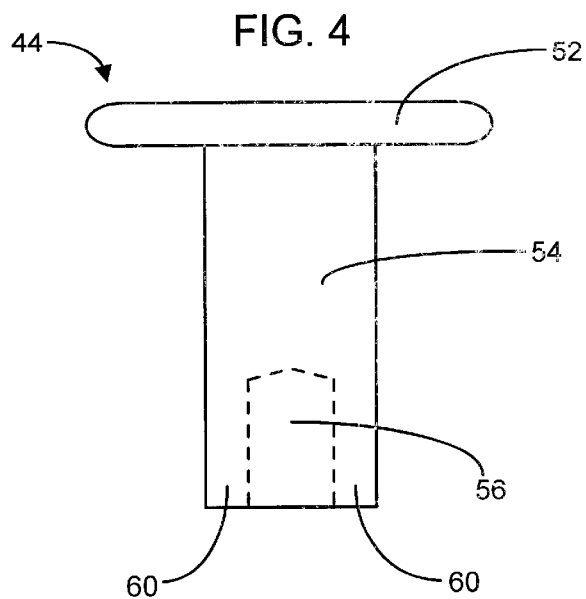
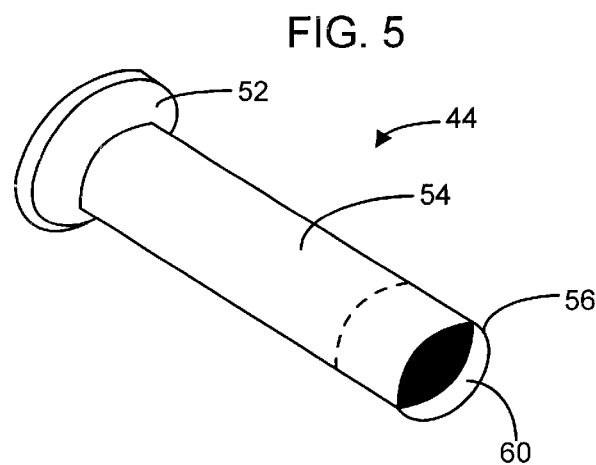
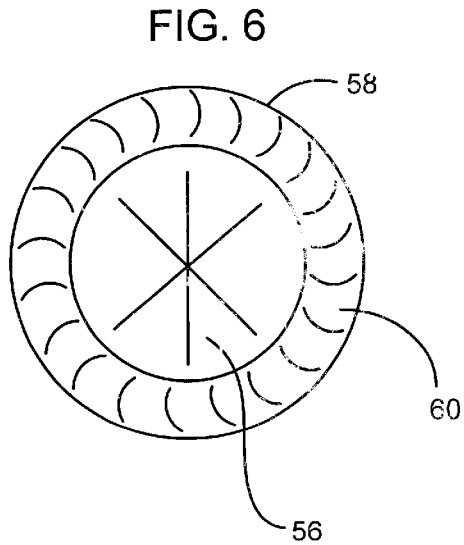

BEDRAIL ATTACHMENTS FOR ENGINEERED WOOD BEDRAIL

BACKGROUND OF THE INVENTION

The present invention relates generally to a hook assembly for an engineered wood bed rail and, more particularly, to a hook fastened to an engineered wood bed rail with rivets, which provide high resistance to removal and increased structural integrity. High quality furniture products, especially those requiring some assembly during set up, require assembly components which are easy to use and provide a high degree of structural integrity once assembled. A rigid and sturdy furniture piece not only provides the appearance of quality, but also eliminates many problems which may occur later on, such as breakdowns and wobbling.

As with any type of manufacturing, economics is of primary importance. Currently, significant increases in bed rail hook structural integrity are accompanied by significant increases in cost. These costs are either passed on to the consumer, absorbed by the manufacturer, or shared by both. Increases in material, machining and labor costs contribute to the increased cost associated with higher structural integrity.

Thus, many consumers choose bed frames made of engineered wood, rather than wood, because engineered wood is less costly and still provides a satisfactory degree of structural integrity. Also, engineered wood may give the appearance of real wood. The term "engineered wood" includes a range of man made wood materials such as particle board, medium density fiberboard, and oriented strand board.

Typically, in wooden bed frames, a flat, metal plate having hooks for engaging a post associated with a headboard or footboard, is mounted in a slide or on the side of a wooden bed rail. The bed rail hook includes multiple apertures through which multiple fasteners extend in order to securely attach the plate to the bed rail. These types of hooks are standard in the wooden bed rail manufacturing industry and consumers are familiar with how these types of hooks are used to install a bed frame. Consumers also find these types of hooks easy to work with.

Bed rails made of engineered wood, however, typically require a different type of hook because the engineered wood is not as strong as real wood. More specifically, hooks are typically attached to wooden bed rails with pegs that extend through the multiple apertures in the bed rail hook and the bed rail. Staples cover the heads of the inserted pegs to hold them in place. These pegs are not suitable for attaching hooks onto engineered wood bed rail, however, because of the consistency of the engineered wood. Thus, a type of hook that can be attached with nuts and bolts is typically used with engineered wood bed rails to provide a more secure joint. Consumers are not as familiar with this type of hook and do not find them as easy to work with as hooks that are traditionally used with wooden bed rails. Further, nuts and bolts are not preferred by manufacturers because they require additional time for insertion during manufacturing and additional material costs. Thus, while the costs of engineered wood bed rails are cheaper than wooden bed rails, the cost of manufacturing the hook assembly is increased.

In view of the forgoing, there is a need for a new and improved hook and fastener assembly for engineered wood bed rails that uses a hook that is traditionally used with wooden bed rails and is capable of providing significant structural integrity by using fasteners which are economical and provide substantial resistance to removal.

SUMMARY OF THE INVENTION

The present invention fulfills this need in the art by providing a bed rail, hook, and fastener assembly for fastening a hook in the end of a man made wood material bed rail including a plurality of rivets, each having a head and a shank, a bed rail hook having a flat body with a plurality of apertures extending through a first end of the body, the bed rail hook apertures having a diameter slightly larger than the shank of the rivets, and a man made wood material bed rail having an end including a slot and a plurality of through-extending apertures. The first end of the bed rail hook is adapted to enter the slot in the end of the bed rail and the bed rail hook apertures are adapted to align with the bed rail apertures when the bed rail hook is inserted in the bed rail slot. During assembly, the rivets are inserted into the bed rail apertures and through the bed rail hook apertures, and an end of the shank of each of the rivets is clinched to provide a removal resistant engagement.

The man made wood material is preferably medium density fiberboard, particle board, or oriented strand board.

Preferably, the rivets are semi tubular rivets and the end of the shank of each of the rivets is clinched to form a rolled clinch. The heads of the rivets are substantially flat and have a diameter greater than the shanks of the rivets. The shanks of the rivets have a length that is longer than a width of the bed rail end in order to allow the rivets to be clinched.

The end of the bed rail also includes a plurality of countersinks on an insertion side of the bed rail. The countersinks are aligned with the bed rail apertures such that when the rivets are inserted into the bed rail apertures and the bed rail hook apertures from said insertion side of the bed rail, the heads of the rivets are substantially flush with the insertion side of the bed rail. The countersinks have a diameter slightly greater than the heads of the rivets.

The bed rail hook includes a second end opposite the first end and the second end has a plurality of downwardly extending hooks adapted to engage a footboard or headboard post. A second plurality of rivets are horizontally mounted through a slot in a man made wood material bedpost, each of the rivets having a head and a shank, and the downwardly extending hooks of the bed rail hook are configured to enter the slot of the bedpost and engage the shanks of the second plurality of rivets respectively.

The invention also provides a method of mounting a bed rail hook having a plurality of through-extending apertures on an end of a man made wood material bed rail that has a slot adapted to receive the bed rail hook and a plurality of through extending apertures including inserting the bed rail hook into the slot, aligning the plurality of apertures of the bed rail and bed rail hook, inserting rivets into the bed rail apertures and the bed rail hook apertures, and clinching ends of the rivets to provide a removal resistant engagement of the hook within the slot. The method also includes the preliminary step of fabricating the bed rail of a man made wood material selected from the either medium density fiberboard, particle board, or oriented strand board. Fabricating includes cutting the slot into the end of the man made wood material bed rail and cutting the apertures orthogonally into the end of the man made wood material bed rail to intersect the slot.

The invention further provides a man made wood material bed rail and bedpost connection using a hook and fastener assembly including a man made wood material bed rail having apertures extending through an end thereof, a bedpost having a slot therein and apertures extending through the bedpost and the intersecting the slot, first and second pluralities of rivets, each of the rivets having a head and a shank, and a bed rail hook having a flat body with a plurality of apertures extending through a first end of the flat body, the bed rail hook apertures having a diameter slightly larger than the shank of the first plurality of rivets. The first plurality of rivets extends through aligned ones of the apertures in the bed rail and apertures in the bed rail hook and have shank ends clinched to provide a removal resistant engagement of the hook in the bed rail. The second plurality of rivets extend through aligned ones of the apertures in the bedpost and have shank ends clinched to provide substantial removal resistance. The bedpost slot and the second plurality of rivets are adapted to allow the bed rail hook to engage the second plurality of rivets within the bedpost slot.

BRIEF DESCRIPTION OF THE DRAWINGS

The invention will become apparent to those skilled in the art after reading the following description of the preferred embodiments when considered with the drawings.

FIG. 4 is a side view of a rivet according to the present invention;

FIG. 5 is a perspective view of the rivet of FIG. 4; and

FIG. 6 is an end view of the rivet of FIG. 4 after being clinched.

DESCRIPTION OF THE PREFERRED EMBODIMENT

Figure 1:
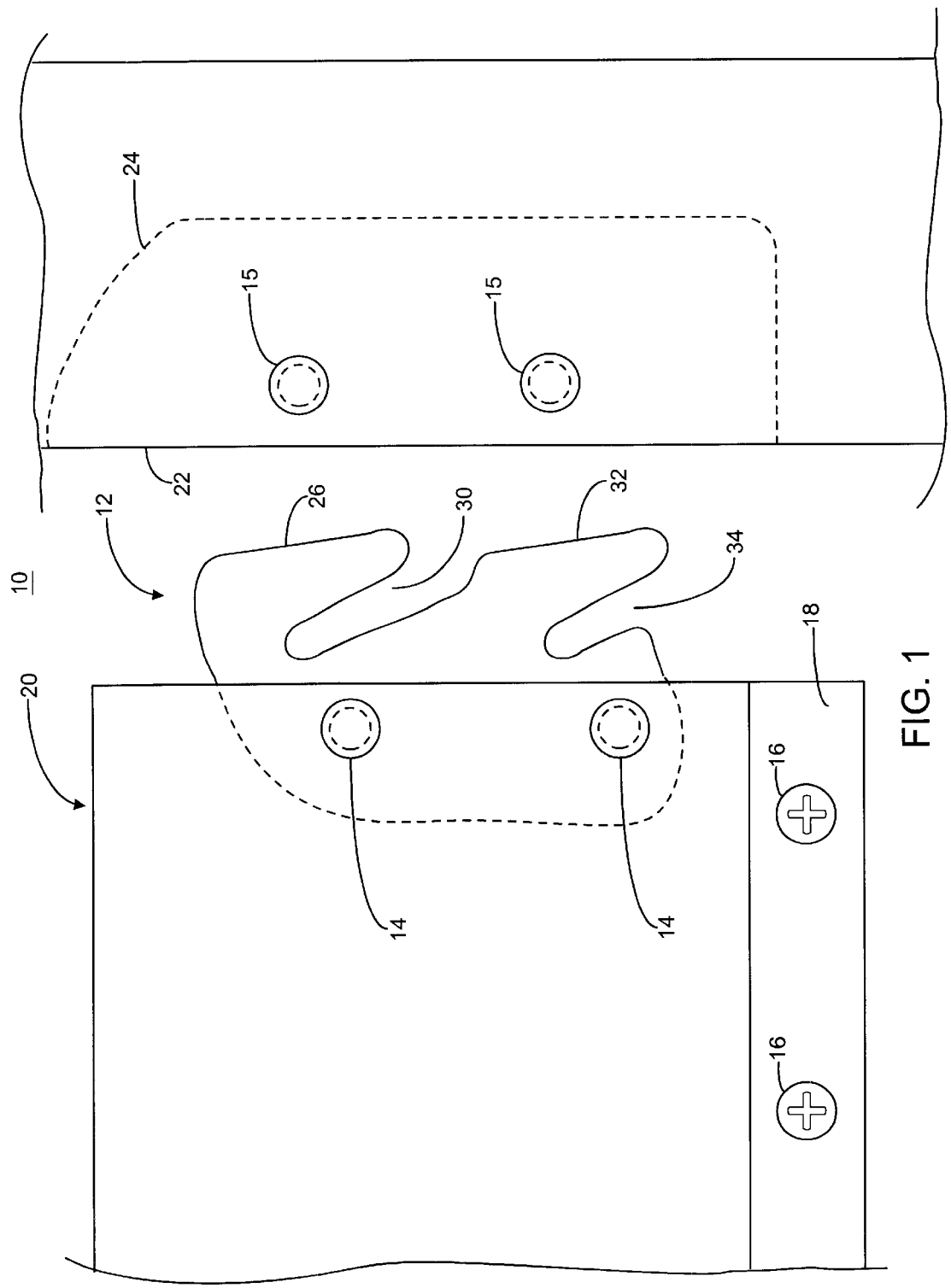
FIG. 1 is a side view of an engineered wood bed rail having a hook and fastener assembly constructed according to a preferred embodiment of the present invention.

In the following description, like reference characters designate like or corresponding parts throughout the several views. Also in the following description, it is to be understood that such times as upwardly, downwardly and the like are words of convenience and are not construed as limiting terms. Referring now to the drawings in general, in FIG. 1 in particular, it should be understood that the illustrations are for the purpose of describing preferred embodiments of the invention and are not intended to limit the invention thereto.

As best seen in FIG. 1, an hook and fastener assembly for an engineered wood bed rail, generally designated 10, is shown constructed according to the present invention. The hook and fastener assembly 10 includes a bed rail hook 12, multiple hook rivets 14, and multiple hook engaging bedpost rivets 15. The hook rivets 14 and the bedpost rivets 15 are preferably, but not necessarily, of similar type and size. Additionally, cleat fasteners 16, are used to fasten a cleat 18 along the bottom edge of a bed rail 20. The bed rail cleat 18 provides an edge on which to lay bed slats (not shown) which support the box springs and mattress (not shown).

The bed rail hook 12 is mounted at an end of the bed rail 20, when assembled, and engages the bedpost rivets 15 mounted to span slot 24 in bedpost 22. The bed rail 20 is made of engineered wood, which may include any suitable man made wood material such as particle board, medium density fiberboard, oriented strand board, and the like. In particular, medium density fiber board is preferred. The bedpost 22 may be a leg or other supporting component of a headboard or footboard of a bed. Typically, the bed rail hook 12 slides into a slot 24 in the bedpost 22. The bed rail hook 12 includes a first downwardly extending hook 26 forming a first indentation 30 and at least a second downwardly extending hook 32 forming a second indentation 34. The downwardly extending hooks 26 and 32 are initially inserted into slot 24 of the bedpost 22 and above the respective bedpost rivets 15. The bed rail hook indentations 30 and 34 are aligned with the bedpost rivets 15 and moved inwardly and downwardly until the hooks 26 and 32 of the bed rail hook 12 securely engage the bedpost rivets 15.

Figure 2:
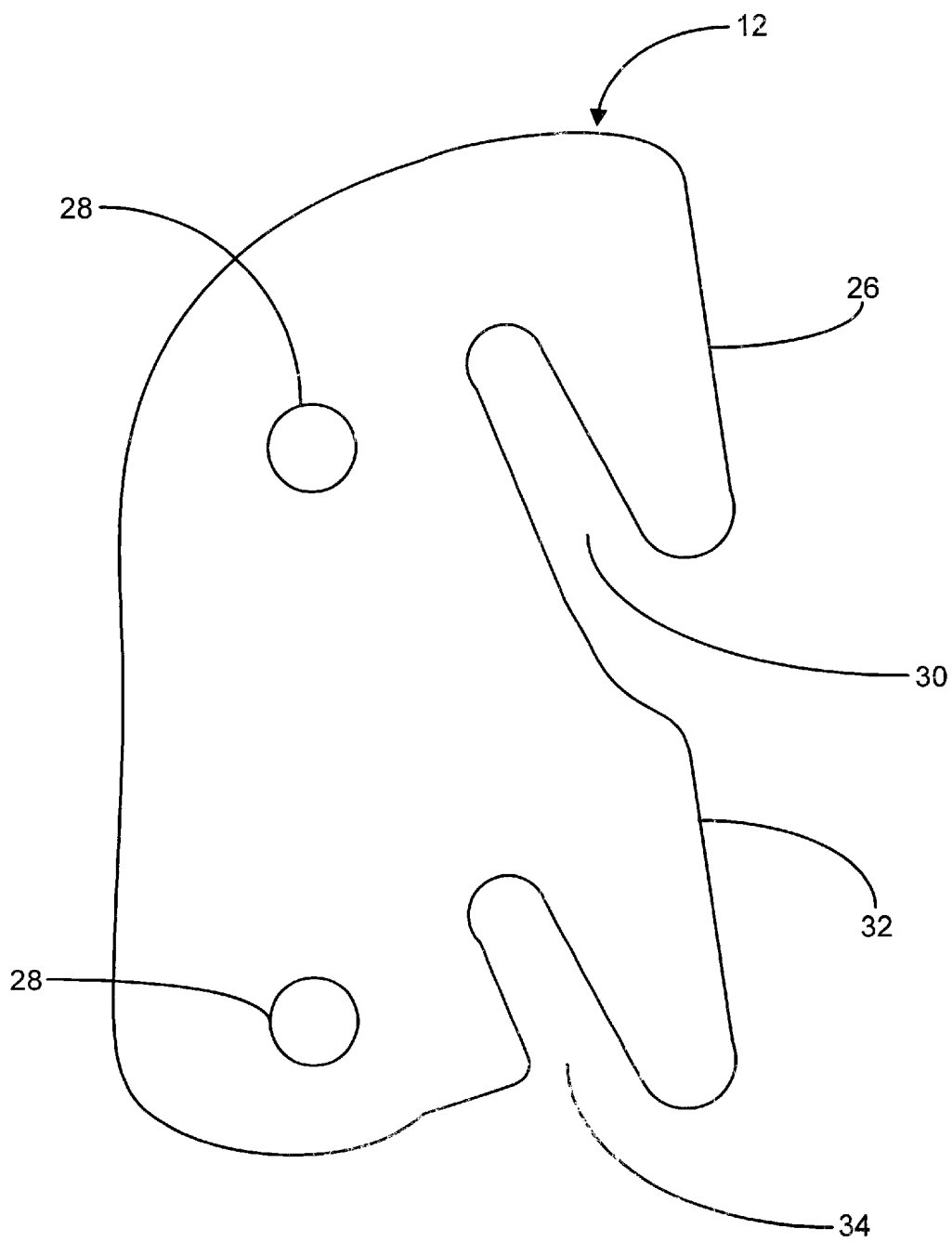
FIG. 2 is a side view of the engineered wood bed rail hook as shown in FIG. 1.

An embodiment of the bed rail hook is shown in FIG. 2. The hook rivets 14 extend through multiple hook apertures 28 when mounting the bed rail hook 12 to the bed rail 20. The apertures 28 extend through the end of the bed rail 20 and are large enough to provide passage of the shank 14b portion of the hook rivet 14 therethrough (see FIG. 3). The apertures 28 may be oversized and elongated to provide for a certain amount of play for the bed rail hook 12. Providing play in the bed rail hook 12 allows for slight adjustments in hook orientation as the bed rail 20 is mounted to the bedpost 22. The hook position will normally adjust and conform to a secure location and orientation. Providing oversized or elongated apertures 28 also allows for greater tolerances associated with the placement of the bedpost rivets 15, which ultimately engage and hold the bed rail hook 12.

Figure 3:
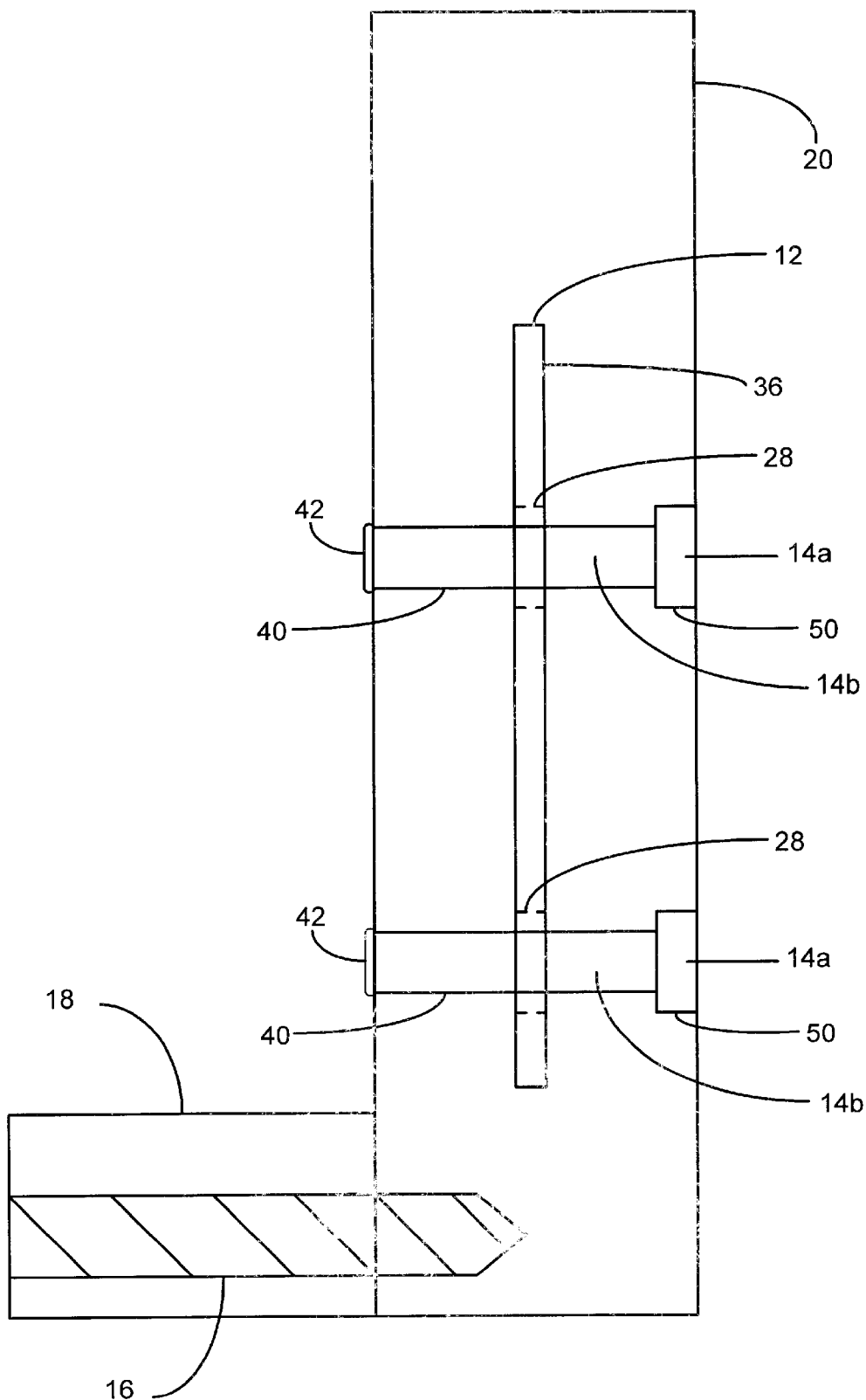
FIG. 3 is an end view of the engineered wood rail having the hook and fastener assembly according to FIG. 1.

FIG. 3 depicts an end view of the bed rail 20 and the hook and fastener assembly 10. Although the bed rail hook 12 may be mounted on the side of the bed rail 20, it is preferably mounted in a slot 36 extending into the end of the bed rail 20. Initially, two apertures or bores 40 are made near the end of the bed rail 20 and extend completely through the bed rail 20. Countersinks 50 are also made on one side of the bed rail. The diameter of the countersinks 50 is only slightly larger than the diameter of the heads 14a of the hook rivets 14. Therefore, when the hook rivets 14 are inserted into the bed rail 20, the heads 14a of the hook rivets 14 fit into the countersinks 50 and provide an unobstructed outer side of the bed rail 20. The shanks 14b of the book rivets 14 are longer than the width of the bed rail 20 so that when the hook rivets 14 are inserted, the ends of the shanks 14b of the hook rivets 14 may be clinched (clinch 42) to secure the rivets in place and provide great resistance to removal and loosening. Thus, in the preferred embodiment, the hook rivets 14 extend through the apertures 40 and the apertures 28 of the bed rail hook 12, and are clinched (clinch 42) to provide security.

As also seen in FIG. 3, the cleat fasteners 16 extend through a majority of the thickness of the bed rail 20.

As shown in FIGS. 4–6, the hook rivets 14 and bed post rivets 15 preferably include semi-tubular rivets 44, which are known in the art. A semi-tubular rivet 44, includes a head 52 and a shank 54. The center of the shank 54 includes a hole 56 which forms ends 60 that will be clinched during assembly. As noted above, the shank 14b of the hook rivets 14 must be longer than the width of the bed rail 20 in order to provide sufficient clearance for clinching. As shown in FIG. 6, in the preferred embodiment, the ends 60 of the semi-tubular rivets 44 are clinched to form a rolled clinch 58. This type of clinch gives maximum strength and removal resistance for semi-tubular rivets. Further, a rolled clinch 58 is easily formed on automatic, pneumatic and manually operated rivet setting machines. Also in the preferred embodiment, the head 52 of the semi-tubular rivet 44 is flat so that it is substantially flush with the side of the bed rail 20 when inserted from the side of the bed rail 20 having countersinks 50.

It should be noted that the type of rivet used, including the size and shape of the head, is dictated by the particular application. Further, the type of clinch used will be dictated by the particular application and type of rivet setting machine used. Certain applications may require an externally visible fastener head. In these applications, countersinks may or may not be provided, and various head shapes and sizes will be used as aesthetically pleasing.

Rivets provide a more economical fastener for hook assemblies for engineered wood bed rails. They are stronger than nuts and bolts and rivet setting machines install and clinch rivets in less time than is needed to install nuts and bolts.

Certain other modifications and improvements will occur to those skilled in the art upon a reading of the forgoing description. It should be understood that all such modifications and improvements have been deleted herein for the sake of consciousness and readability but are properly within the scope of the following claims.

What is claimed is:

1. A bed rail, hook, and fastener assembly for fastening a hook in the end of a man made wood material bed rail comprising:

a plurality of rivets, each having a head and a shank;

a bed rail hook having a flat body with a plurality of apertures extending through a first end of said body, said bed rail hook apertures having a diameter slightly larger than the shank of said rivets; and a man made wood material bed rail having an end including a slot and a plurality of through-extending apertures;

wherein the first end of said bed rail hook is adapted to enter the slot in the end of said bed rail;

wherein said bed rail hook apertures are adapted to align with said bed rail apertures when said bed rail hook is inserted in said bed rail slot;

wherein during assembly said rivets are inserted into said bed rail apertures and through said bed rail hook apertures, and an end of the shank of each of said rivets is clinched to provide a removal resistant engagement; and wherein the end of said bed rail further includes a plurality of countersinks on an insertion side of said bed rail, said countersinks being aligned with said bed rail apertures such that when said rivets are inserted into said bed rail apertures and said bed rail hook apertures from said insertion side of said bed rail, the heads of said rivets are substantially flush with said insertion side of said bed rail.

2. The assembly of claim 1 wherein said man made wood material includes material selected from the group consisting of median density fiberboard, particle board, an oriented strand board.

3. The assembly of claim 1 wherein said rivets are semi tubular rivets.

4. The assembly of claim 1 wherein when the end of the shank of each of said rivets is clinched a rolled clinch is formed.

5. The assembly of claim 1 wherein the heads of said rivets are substantially flat and have a diameter greater than the shanks of said rivets.

6. The assembly of claim 1 wherein the shanks of said rivets have a length that is longer than a width of said bed rail end in order to allow said rivets to be clinched.

7. The assembly of claim 1 wherein said countersinks have a diameter slightly greater than the heads of said rivets.

8. The assembly of claim 1 wherein said bed rail hook includes a second end opposite said first end, said second end having a plurality of downwardly extending hooks adapted to engage a footboard or headboard post.

9. The assembly of claim 8 further comprising a second plurality of rivets horizontally mounted through a slot in a man made wood material bedpost, each of said rivets having a head and a shank, said downwardly extending hooks of said bed rail hook configured to enter said slot of said bedpost and engage the shanks of said second plurality of rivets respectively.

10. The assembly of claim 9 wherein said man made wood material includes material selected from the group consisting of medium density fiberboard, particle board, and oriented strand board.

11. A method of mounting a bed rail hook having a plurality of through-extending apertures on an end of a man made wood material bed rail that has a slot adapted to receive the bed rail hook and a plurality of through extending apertures comprising:

inserting the bed rail hook into the slot;

aligning the plurality of apertures of the bed rail and bed rail hook;

inserting rivets into the bed rail apertures and the bed rail hook apertures including locating rivet heads in countersinks around the bed rail apertures; and clinching ends of the rivets into the countersinks to provide a removal resistant engagement of the hook within the slot.

12. The method of claim 11 comprising the preliminary step of fabricating the bed rail of a man made wood material selected from the group consisting of medium density fiberboard, particle board, and oriented strand board.

13. The method of claim 12 wherein fabricating includes cutting the slot into the end of the man made wood material bed rail and cutting the bed rail apertures orthogonally into the end of the man made wood material bed rail to intersect the slot.

14. A man made wood material bed rail and bedpost connection using a hook and fastener assembly comprising:

a man made wood material bed rail having apertures extending through an end thereof;

a bedpost having a slot therein and apertures extending through said bedpost and said intersecting said slot;

first and second pluralities of rivets, each of said rivets having a head and a shank; and a bed rail hook having a flat body with a plurality of apertures extending through a first end of said flat body with countersinks on at least insertion ends of the apertures, said bed rail hook apertures having a diameter slightly larger than the shank of said first plurality of rivets and the countersinks having a diameter slightly larger than the head of said first plurality of rivets;

said first plurality of rivets extending through aligned ones of the apertures in said bed rail and apertures in said bed rail hook and having shank ends of said first plurality of rivets clinched to provide a removal resistant engagement of the hook in the bed rail;

said second plurality of rivets extending through aligned ones of the apertures in said bedpost and having shank ends of said second plurality of rivets clinched to provide substantial removal resistance;

said bedpost slot and said second plurality of rivets adapted to allow said bed rail hook to engage said second plurality of rivets within said bedpost slot.

15. The assembly of claim 14 wherein said man made wood material includes material selected from the group consisting of medium density fiberboard, particle board, and oriented strand board.

* * * * *